(12) United States Patent
Kamio

(10) Patent No.: US 10,794,479 B2
(45) Date of Patent: Oct. 6, 2020

(54) SHIFT RANGE CONTROL DEVICE

(71) Applicant: DENSO CORPORATION, Kariya, Aichi-pref. (JP)

(72) Inventor: Shigeru Kamio, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/512,754

(22) Filed: Jul. 16, 2019

(65) Prior Publication Data
US 2019/0338851 A1 Nov. 7, 2019

Related U.S. Application Data

(63) Continuation of application No. PCT/JP2018/025605, filed on Jul. 5, 2018.

(30) Foreign Application Priority Data

Jul. 10, 2017 (JP) ................................. 2017-134637

(51) Int. Cl.
*F16H 61/02* (2006.01)
*F16H 61/32* (2006.01)
*H02P 23/18* (2016.01)
*H02P 23/20* (2016.01)
*F16H 59/08* (2006.01)

(52) U.S. Cl.
CPC ............. *F16H 61/32* (2013.01); *F16H 59/08* (2013.01); *F16H 61/0204* (2013.01); *H02P 23/183* (2016.02); *H02P 23/20* (2016.02); *F16H 2061/326* (2013.01)

(58) Field of Classification Search
CPC .......... F16H 59/04; F16H 59/08; F16H 59/02; F16H 59/38; F16H 61/02; F16H 61/0204; F16H 61/0213; F16H 61/12
See application file for complete search history.

(56) References Cited

U.S. PATENT DOCUMENTS

| | | | |
|---|---|---|---|
| 7,511,444 B2 | 3/2009 | Nakai et al. | |
| 2006/0261760 A1* | 11/2006 | Shinojima | H02K 7/116 318/34 |
| 2012/0255385 A1* | 10/2012 | Nakayama | F16H 19/001 74/437 |
| 2015/0162855 A1* | 6/2015 | Chien | H02P 27/085 318/139 |
| 2018/0283545 A1* | 10/2018 | Yamada | H02P 6/17 |

* cited by examiner

*Primary Examiner* — Edwin A Young
(74) *Attorney, Agent, or Firm* — Nixon & Vanderhye P.C.

(57) ABSTRACT

A shift range control device switches a shift range by controlling the driving of a motor. An angle calculation unit acquires a motor rotation angle signal outputted from a motor rotation angle sensor that detects the rotation position of the motor, and calculates a motor angle. A signal acquisition unit acquires an output shaft signal, which is outputted from an output shaft sensor for detecting the rotation position of an output shaft through which the rotation of the motor is transmitted. A value of the output shaft signal changing in steps in accordance with the rotation position of the output shaft. A target setting unit sets a motor angle target value by correcting, in accordance with a speed of the motor at the timing at which the acquired output shaft signal changes, a pre-correction motor angle target value that is set on the basis of a target shift range and a change point at which the output shaft signal changes. A drive control unit controls driving of the motor so that the motor angle reaches the motor angle target value.

7 Claims, 6 Drawing Sheets

SHIFT RANGE CONTROL DEVICE

CROSS REFERENCE TO RELATED APPLICATION

The present application is a continuation application of International Patent Application No. PCT/JP2018/025605 filed on Jul. 5, 2018, which designated the U.S. and claims the benefit of priority from Japanese Patent Application No. 2017-134637 filed on Jul. 10, 2017. The entire disclosures of all of the above applications are incorporated herein by reference.

FIELD

The present disclosure relates to a shift range control device.

BACKGROUND

Conventionally, a shift range switching device, which switches a shift range of a vehicle by controlling a motor in accordance with a shift range switching request from a driver, is known. For example, an output shaft sensor is provided to detect a rotation angle of an output shaft firmly fitted and coupled to a rotation shaft of a speed reduction mechanism that transmits rotation of a motor after speed reduction. In the shift range switching device, detection values of an encoder and an output shaft sensor are used for drive control of a motor.

SUMMARY

A shift range control device according to the present disclosure switches a shift range by controlling driving of a motor. The shift range control device acquires a motor rotation angle signal outputted from a motor rotation angle sensor and calculates a motor angle. The shift range control device acquires an output shaft signal, which is outputted from an output shaft sensor for detecting a rotation position of an output shaft. The shift range control device sets a motor angle target value and controls driving of the motor such that the motor angle becomes the motor angle target value.

BRIEF DESCRIPTION OF THE DRAWINGS

The above and other objects, features and advantages of the present disclosure will become more apparent from the following detailed description taken in conjunction with the accompanying drawings. In the drawings.

EMBODIMENT

Embodiment

Figure 1:
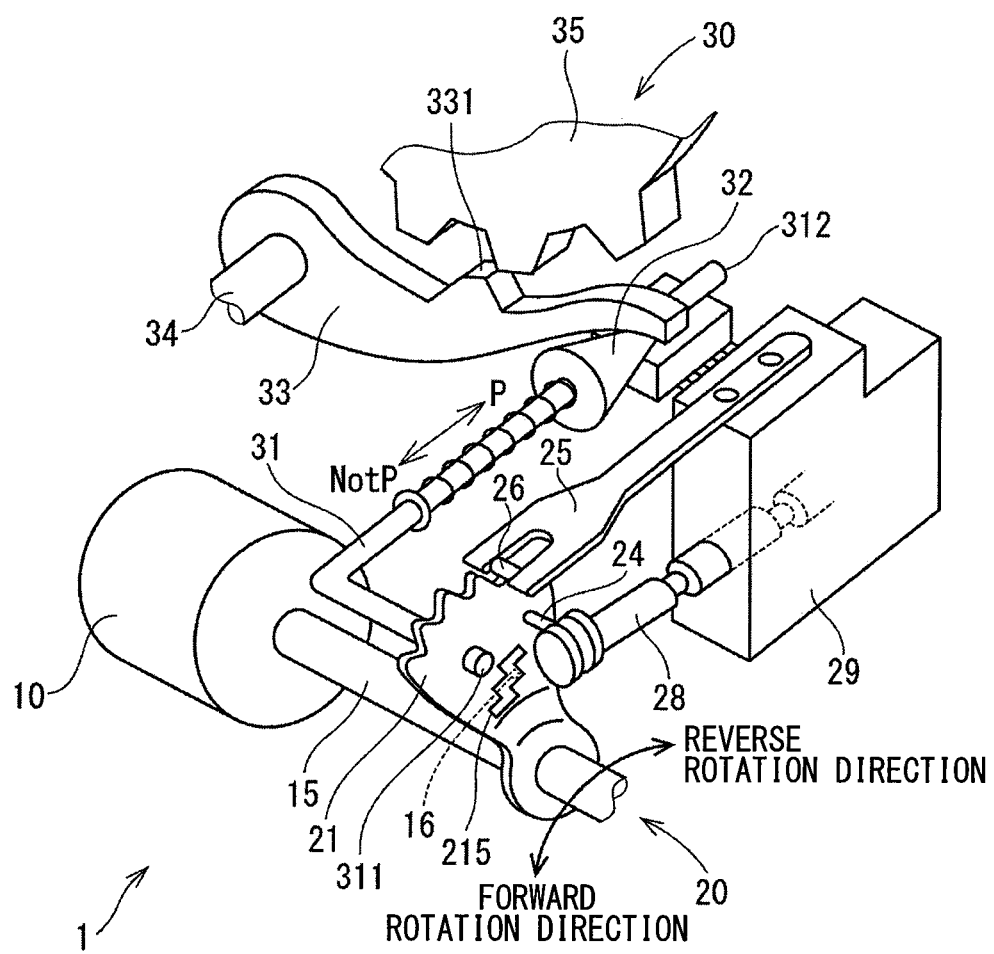
FIG. 1 is a perspective view showing a shift-by-wire system according to one embodiment.
Figure 2:
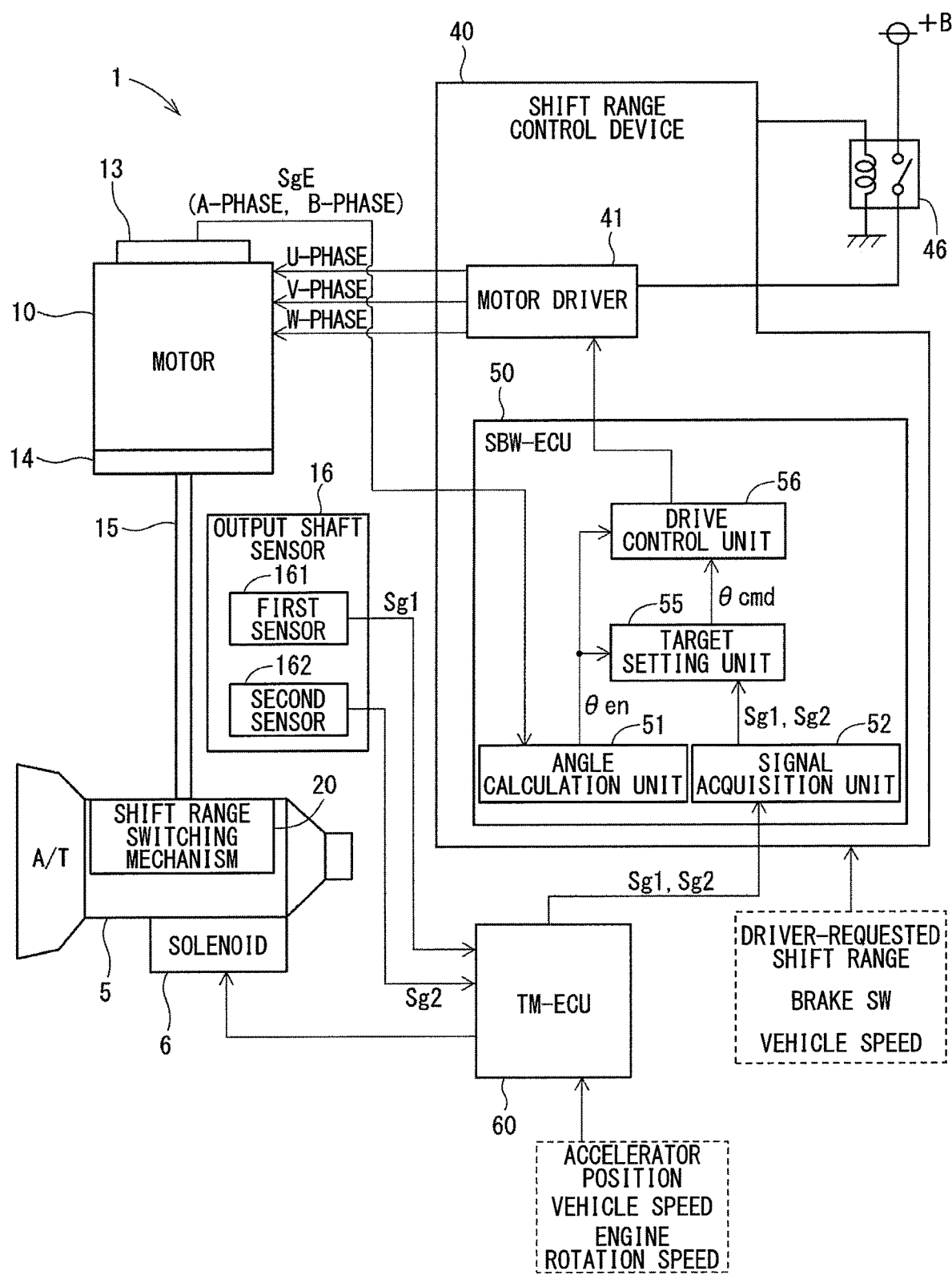
FIG. 2 is a block diagram showing a general configuration of the shift-by-wire system according to the embodiment.

A shift range control device will be hereinafter described with reference to the drawings. As shown in FIG. 1 and FIG. 2, a shift-by-wire system 1 as a shift range switching device according to one embodiment includes a motor 10, a shift range switching mechanism 20, a parking lock mechanism 30, a shift range control device 40, and the like. The motor 10 is rotated by power supplied from a battery which is installed in a vehicle (not shown) and functions as a drive source of the shift range switching mechanism 20. The motor 10 of the present embodiment is a permanent magnet type DC brushless motor.

As shown in FIG. 2, an encoder 13 as a motor rotation angle sensor detects a rotation position of a rotor (not shown) of the motor 10. The encoder 13 is a magnetic type rotary encoder and includes a magnet rotating with a rotor, a Hall IC for detecting magnetic field or the like. The encoder 13 outputs A-phase and B-phase pulse signals for each predetermined angle in synchronism with the rotation of the rotor. Hereinafter, the signals from the encoder 13 are referred to as a motor rotation angle signals SgE. In the present embodiment, the encoder 13 is configured as a single system that outputs one signal each for the A-phase and the B-phase. In the present embodiment, the encoder 13 has higher angle detection accuracy than the output shaft sensor 16.

A speed reducer 14 is provided between a motor shaft of the motor 10 and an output shaft 15 and outputs the rotation of the motor 10 to the output shaft 15 after speed reduction. The rotation of the motor 10 is thus transmitted to the shift range switching mechanism 20.

The output shaft sensor 16 has a first sensor unit 161 and a second sensor unit 162, and detects a rotation position of the output shaft 15. The output shaft sensor 16 according to the present embodiment is a magnetic sensor that detects a change in the magnetic field of a target 215 (refer to FIG. 1) provided on a detent plate 21, which is a rotation member described later. The output shaft sensor 16 is attached to a position where the magnetic field of the target 215 is detectable. In the figure, the first sensor unit 161 is labeled as a first sensor and the second sensor unit 162 is labeled as a second sensor.

The sensor units 161 and 162 are so-called MR sensors having magnetoresistive elements (MR elements), which detect changes in the magnetic field of the target 215. The first sensor unit 161 detects a magnetic field corresponding to the rotation position of the target 215, and outputs the output shaft signal Sg1 to a TM-ECU 60. The second sensor unit 162 detects a magnetic field corresponding to the rotation position of the target 215, and outputs the output shaft signal Sg2 to the TM-ECU 60. The output shaft sensor 16 of the present embodiment includes two sensor units 161 and 162, and independently transmit the output shaft signals Sg1 and Sg2 to the ECU 50. That is, the output shaft sensor 16 has a dual system.

In the present embodiment, the output shaft sensor 16 is a magnetic sensor that detects a change in the magnetic field of the target 215 without contact. Thereby, as compared with a contact type sensor, the output shaft signals Sg1 and Sg2 can be easily multiplexed without largely changing the configuration on the actuator side. The output shaft signals Sg1 and Sg2 can be suitably used for abnormality monitoring such as diagnosis and failsafe of the shift-by-wire system 1 because the output shaft signals Sg1 and Sg2 can meet a request for relatively high safety by multiplexing (in the present embodiment, doubling) the output shaft signals Sg1 and Sg2.

As shown in FIG. 1, the shift range switching mechanism 20 includes the detent plate 21, a detent spring 25 and the like. The shift range switching mechanism 20 transmits the rotational drive force output from the speed reducer 14 to a manual valve 28 and the parking lock mechanism 30.

The detent plate 21 is fixed to the output shaft 15 and rotates integrally with the output shaft 15 when the motor 10 is driven. The detent plate 21 has a pin 24 protruding in parallel with the output shaft 15. The pin 24 is connected to the manual valve 28. As the detent plate 21 is driven by the motor 10, the manual valve 28 reciprocates in the axial direction. That is, the shift range switching mechanism 20 converts the rotational motion of the motor 10 to the linear movement and transmits it to the manual valve 28. The manual valve 28 is provided to a valve body 29. The reciprocating movement of the manual valve 28 in the axial direction switches hydraulic pressure supply paths to a hydraulic clutch (not shown) to switch the engaged state of the hydraulic clutch, so that the shift range is switched.

Figure 3:
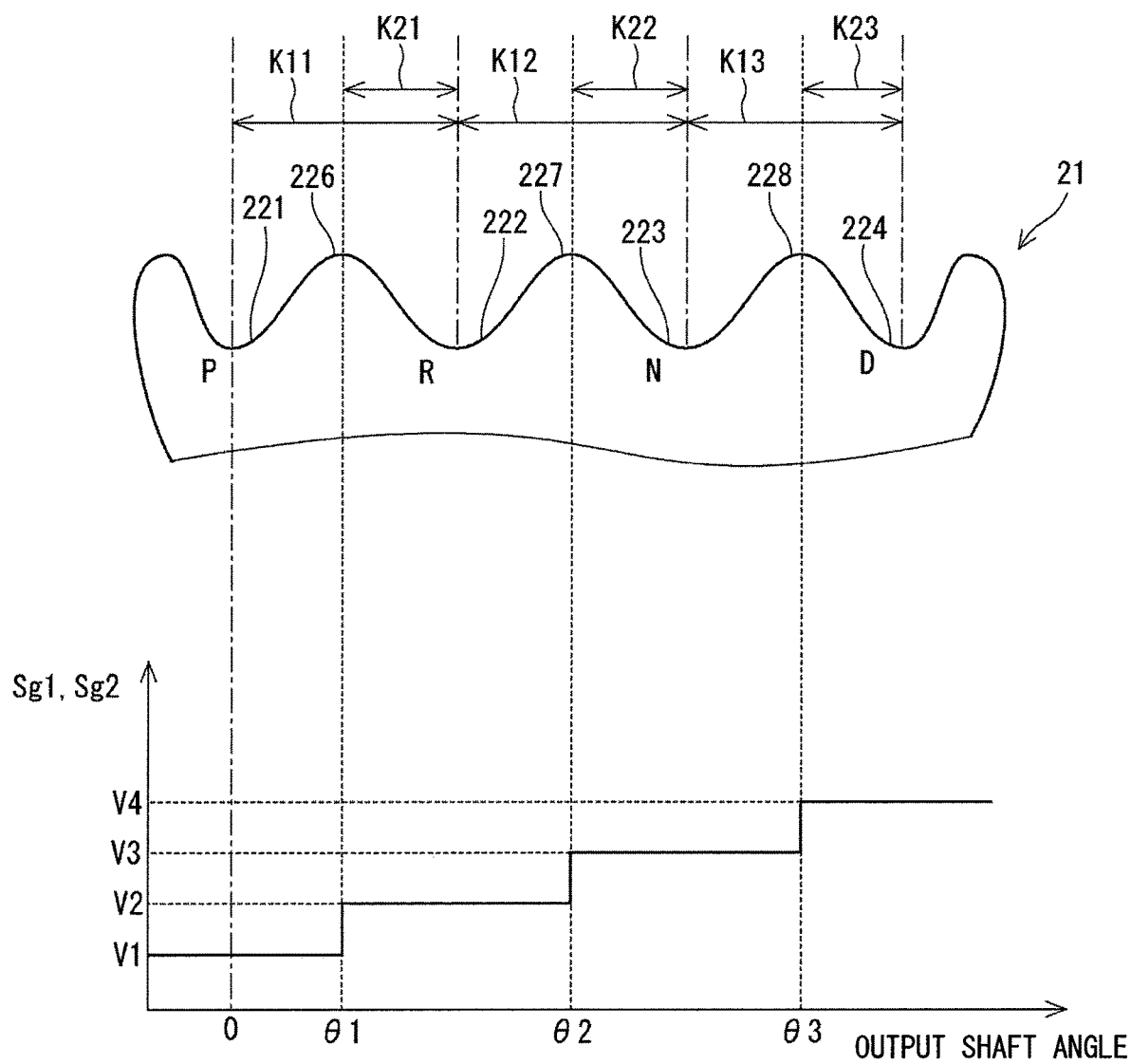
FIG. 3 is an illustration of an output shaft signal according to the embodiment.

As schematically shown in FIG. 3, four valley sections 221 to 224 are provided on the detent spring 25 side of the detent plate 21. A first valley section 221, a second valley section 222, a third valley section 223 and a fourth valley section 224 correspond to a parking range P, a reverse range R, a neutral range N and a drive range D of a vehicle, respectively. Further, a first ridge section 226, a second ridge section 227 and a third ridge section 228 are provided between the first valley section 221 and the second valley section 222, between the second valley section 222 and the third valley section 223 and between the third valley section 223 and the fourth valley section 224. In FIG. 3, a one-dot chain line indicates each center position of the valley sections 221 to 224.

As shown in FIG. 1, the detent plate 21 is provided with the target 215 whose magnetic field changes according to the rotation of the output shaft 15. The target 215 is formed of a magnetic material. The target 215 may be a separate member from the detent plate 21. Alternatively, the target 215 may be formed by pressing, for example, in case that the detent plate 21 is a magnetic material. The target 215 is formed such that output voltages, which are the output shaft signals Sg1 and Sg2 of the output shaft sensor 16, change stepwise in accordance with the rotation position of the output shaft 15. Details of the output shaft signals Sg1 and Sg2 will be described later.

The detent spring 25 is a resiliently deformable plate-like member provided with a detent roller 26 at a tip end. The detent roller 26 is an engagement member. The detent roller 26 fits into one of the valley sections 221 to 224. In the present embodiment, since the number of valley sections 221 to 224 formed in the detent plate 21 is four, the number of engagement positions in which the detent roller 26 engages is four, the number of engagement positions at which the detent roller 26 is engaged is four.

The detent spring 25 presses the detent roller 26 toward the rotation centers of the detent plate 21. When a rotational force equal to or larger than a predetermined level is applied to the detent plate 21, the detent spring 25 is deformed resiliently to enable the detent roller 26 to move among the valley sections 221 to 224. When the detent roller 26 fits into one of the valley sections 221 to 224, swing movement of the detent plate 21 is restricted. In this way, an axial position of a manual valve 28 and a state of the parking lock mechanism 30 are determined and the shift range of the automatic transmission 5 is fixed.

The parking lock mechanism 30 includes a parking rod 31, a conical member 32, a parking lock pawl 33, a shaft part 34 and a parking gear 35. The parking rod 31 is generally L-shaped, and one end 311 side is fixed to the detent plate 21. The conical member 32 is provided to the other end 312 side of the parking rod 31. The conical member 32 is formed so as to contract toward the other end 312 side. When the detent plate 21 pivots in a reverse rotation direction, the conical member 32 moves in an arrow direction toward "P" indicating a parking range.

The parking lock pawl 33 is provided to abut on a conical surface of the conical member 32 and pivot around the shaft part 34. On the parking gear 35 side in the parking lock pawl 33, the parking lock pawl 33 has a protrusion 331 that can mesh with the parking gear 35. When the detent plate 21 rotates in the reverse rotation direction and the conical member 32 moves in the direction of the arrow P, the parking lock pawl 33 is pushed up so that the protrusion 331 meshes with the parking gear 35. By contrast, when the detent plate 21 rotates in the forward rotation direction and the conical member 32 moves in an arrow direction toward "NotP" indicating a range which is not the parking range, the protrusion 331 is released from meshing with the parking gear 35.

The parking gear 35 is placed at an axle (not shown) so as to be capable of meshing with the protrusion 331 of the parking lock pawl 33. The parking gear 35 meshing with the protrusion 331 restricts the rotation of the axle. When the shift range is one of NotP ranges, which are other than the P range, the parking gear 35 is not locked by the parking lock pawl 33 and the rotation of the axle is not restricted by the parking lock mechanism 30. When the shift range is the P range, the parking gear 35 is locked by the parking lock pawl 33 and the rotation of the axle is restricted.

As shown in FIG. 2, the shift range control device 40 includes a motor driver 41, a shift-by-wire ECU 50 and the like. The shift-by-wire ECU may be referred to simply as "SBW-ECU." The motor driver 41 outputs a drive signal related to energization of each phase (U-phase, V-phase, W-phase) of the motor 10. A motor relay 46 is provided between the motor driver 41 and a battery. The motor relay 46 is turned on when a start switch of a vehicle, such as an ignition switch, is turned on, so that power is supplied to the motor 10. The motor relay 46 is turned off when the start switch is turned off, so that power supply to the motor 10 is shut down.

The SBW-ECU 50 controls the switching of the shift range by controlling the drive of the motor 10 based on a driver-requested shift range, a signal from a brake switch, a vehicle speed and the like. A transmission ECU 60 as a transmission control unit controls the driving of a transmission hydraulic pressure control solenoid 6 based on an accelerator position, a vehicle speed, an engine speed, the output shaft signals Sg1 and Sg2, and the like. By controlling the transmission hydraulic pressure control solenoid 6, the shift stage is controlled. The transmission hydraulic pressure control solenoid 6 is provided in number in correspondence to the number of the shift ranges and the like. The transmission ECU may be referred to simply as "TM-ECU."

Each of the ECUs 50 and 60 is mainly formed of a microcomputer or the like, and internally includes, although not shown, a CPU, a ROM, a RAM, an I/O, a bus line for connecting these components, and the like. Each processing executed by the ECU 50 and 60 may be software processing or may be hardware processing. The software processing may be implemented by causing the CPU to execute a program. The program may be stored beforehand in a memory device such as a ROM, that is, in a readable non-transitory tangible storage medium. The hardware processing may be implemented by a special purpose electronic circuit.

The ECUs 50 and 60 are configured to be able to mutually transmit and receive information via, for example, a CAN (Controller Area Network) or the like. In the present embodiment, the output shaft signals Sg1 and Sg2 from the output shaft sensor 16 are output to the TM-ECU 60 and transmitted from the TM-ECU 60 to the SBW-ECU 50 by CAN communication or the like.

The SBW-ECU 50 includes an angle calculation unit 51, a signal acquisition unit 52, a target setting unit 55, a drive control unit 56, and the like. These units 51 to 56 indicate functions executed as angle calculation processing, signal acquisition processing, target setting processing, drive control processing and the like processing, respectively, by the microcomputer. The angle calculation unit 51 acquires the motor rotation angle signal SgE from the encoder 13 and calculates an encoder count value $\theta$en which is a count value of the encoder 13. The encoder count value $\theta$en is a value which corresponds to an actual mechanical angle and an electrical angle of the motor 10. In the present embodiment, the encoder count value $\theta$en corresponds to the "motor angle." The calculation of the encoder count value $\theta$en is executed by an interrupt each time an edge of the motor rotation angle signal SgE is detected.

The signal acquisition unit 52 acquires the output shaft signals Sg1 and Sg2 from the TM-ECU 60. The output shaft signals Sg1 and Sg2 are acquired at a predetermined cycle interval (for example, 10 ms cycle interval). The acquisition cycle of the output shaft signals Sg1 and Sg2 is, for example, a communication cycle interval of CAN.

The target angle setting unit 55 sets a target shift range based on the driver-requested shift range based on a shift switch or the like, the vehicle speed, the signal from the brake switch and the like. Further, the target setting unit 55 sets a target count value $\theta$cmd, which is a motor angle target value, according to the target shift range. Details of setting of the target count value $\theta$cmd will be described later.

The drive control unit 56 controls the drive of the motor 10 by feedback control or the like so that the motor 10 is stopped at the rotation position where the encoder count value $\theta$en becomes the target count value $\theta$cmd. Details of the motor drive control for the motor 10 are not limited in particular.

FIG. 3 schematically shows the detent plate 21 in the upper part, and the output shaft signals Sg1 and Sg2 in the lower part. The output shaft angle $\theta$s is an angle corresponding to the rotation position of the output shaft 15. The angle when the detent roller 26 is positioned at the center of the first valley section 221 is assumed to be 0. The angle when the detent roller 26 is positioned at a top of the first ridge section 226 is assumed to be $\theta$1. The angle when the detent roller 26 is positioned at a top of the second ridge section 227 is assumed to be $\theta$2. The angle when the detent roller 26 is positioned at a top of the third ridge section 228 is assumed to be $\theta$3.

When the output shaft angle $\theta$s is smaller than the angle $\theta$1, the output shaft signals Sg1 and Sg2 are constant at a value V1. When the output shaft angle $\theta$s becomes the angle $\theta$1, the output shaft signals Sg1 and Sg2 change from the value V1 to a value V2. The output shaft signals Sg1 and Sg2 are constant at the value V2 in a range where the output shaft angle $\theta$s is equal to or larger than the angle $\theta$1 and smaller than an angle $\theta$2. When the output shaft angle $\theta$s becomes the angle $\theta$2, the output shaft signals Sg1 and Sg2 change from the value V2 to a value V3. The output shaft signals Sg1 and Sg2 are constant at the value V3 in a range where the output shaft angle $\theta$s is equal to or larger than the angle $\theta$2 and smaller than an angle $\theta$3. When the output shaft angle $\theta$s becomes the angle $\theta$3, the output shaft signals Sg1 and Sg2 change to a value V4. When the output shaft angle $\theta$s is equal to or larger than the angle $\theta$3, the output shaft signals Sg1 and Sg2 are constant at the value V4.

The values V1, V2, V3 and V4 to which the output shaft signals Sg1 and Sg2 change possibly are discrete and not an intermediate value between two adjacent values. Further, a difference between the value V1 and the value V2, a difference between the value V2 and the value V3, and a difference between the value V3 and the value V4 are set to be sufficiently large values, respectively, as compared with the resolution and the sensor error. That is, in the present embodiment, the switching of the value from the first value to the second value, which differs to such an extent that it cannot be regarded as a continuous value in the movement among the valley sections 221 to 224 of the detent roller 26, is referred to as "a stepwise change." The differences between the value V1 and the value V2, between the value V2 and the value V3 and between the value V3 and the value V4 may be equal or different one another. In the present embodiment, the values are assumed to be in a magnitude relation V1<V2<V3<V4, but this magnitude relation of the values V1 to V4 may be different.

In the present embodiment, the number of engagement positions of the detent roller 26 is four. The output shaft sensor 16 and the target 215 are provided so that the output shaft signals Sg1 and Sg2 change in four steps according to the engagement position of the detent roller 26. That is, in the present embodiment, the number of engagement positions and the number of steps of the output voltages that can be taken by the output shaft signals Sg1 and Sg2 coincide with each other. For example, in case that the output shaft signal is an analog signal that changes continuously according to the rotational position of the output shaft 15 as a reference example, processing such as AD conversion is required. In the present embodiment, the output shaft signals Sg1 and Sg2 change stepwise according to the range. In case that the output shaft signals Sg1 and Sg2 have about four steps, processing such as AD conversion in the output shaft sensor 16 becomes unnecessary, so the configuration of the output shaft sensor 16 can be simplified.

An angle design value K11 between the centers of the valley sections 221 and 222, an angle design value K12 between the centers of the valley sections 222 and 223 and an angle design value K13 between the centers of the valley sections 223 and 224, which are shown in FIG. 3, are stored in advance in a ROM (not shown) or the like. Also, the change point of the output shaft signals Sg1 and Sg2 and an angle design value between the centers of the adjacent valleys are stored in advance as design values in the storage unit such as a ROM. In the present embodiment, the output shaft signals Sg1 and Sg2 change at top points of the ridge sections 226 to 228. Therefore, an angle design value K21 between the top point of the first ridge section 226 and the center of the second valley section 222, a second design value K22 between a top point of the second ridge section 227 and the center of the third valley section 223 and an angle design value K23 between a top point of the ridge section 228 and the center of the fourth valley 224 are stored.

In the present embodiment, switching from the P range to a range other than the P range will be mainly described below. It is therefore assumed that the change point of the output shaft signals Sg1 and Sg2 and the angle design value between the adjacent valley sections on the forward rotation direction side are assumed. The change points of the output shaft signals Sg1 and Sg2 and the angle design values between the adjacent valley sections on the reverse rotation direction side may also be stored in advance. Alternatively, it may be calculated from the angle design values K11 to K13 and K21 to K23. The angle design values K11 to K13 and K21 to K23 are all assumed to correspond to the count values of the encoder 13, but may be any values that can be converted into angles. In addition, design values to be stored in advance can be appropriately changed according to the control configuration and the like.

In the present embodiment, since the output shaft signals Sg1 and Sg2 change stepwise, a target count value θcmd is set based on the encoder count value θen at the change timing when the output shaft signals Sg1 and Sg2 change. Further, in the present embodiment, since the output shaft signals Sg1 and Sg2 are acquired from the TM-ECU 60, changes in the output shaft signals Sg1 and Sg2 are detected in the SBW-ECU 50 with delays due to detection delay and communication delay. Therefore, in the present embodiment, the target count value θcmd is corrected using a motor speed Msp, which is the rotation speed of the motor 10. The motor speed Msp is calculated based on the encoder count value θen, for example, by differentiation.

Figure 4:
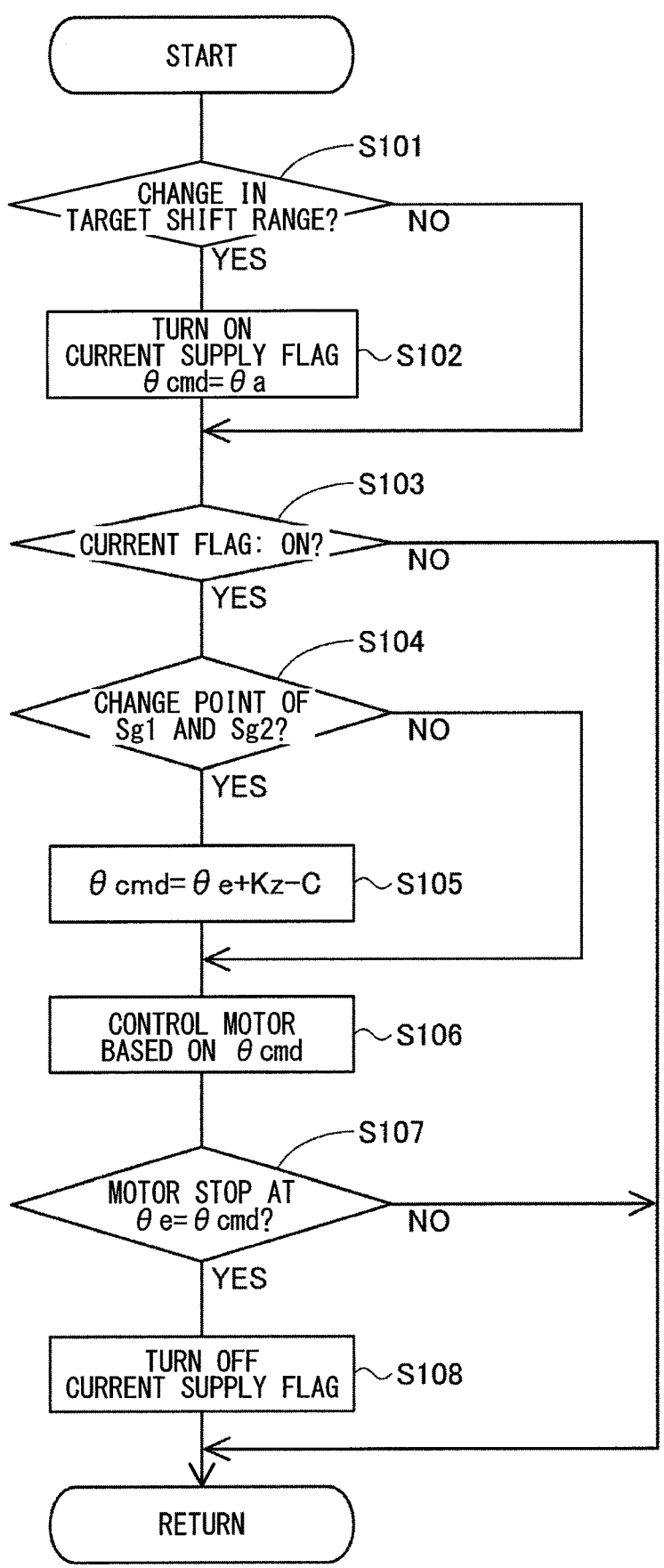
FIG. 4 is a flowchart showing target angle setting processing according to the embodiment.

Command calculation processing in the present embodiment will be described with reference to a flowchart of FIG. 4. The present processing is executed by the SBW-ECU 50 at a predetermined cycle interval. Hereinafter, "step" of step S101 is simply indicated as a symbol "S." Other steps are also indicated simply as S. In the first S101, the target setting unit 55 checks whether the target shift range has been changed. In case it is determined that the target shift range has not been changed (S101: NO), the processing proceeds to S103. In case it is determined that the target shift range has been changed (S101: YES), the processing proceeds to S102.

In S102, the SBW-ECU 50 turns on a current supply flag. Further, the target setting unit 55 sets the target count value θcmd as a temporary target value θa. The temporary target value θa is set to any value that allows the motor 10 to rotate ahead of the change point at which the output shaft signals Sg1 and Sg2 first change.

In S103, the target setting unit 55 checks whether the current supply flag has been turned on. In case it is determined that the current supply flag is off (S103: NO), this routine is finished without executing processing of S104 and subsequent steps. In case it is determined that the current supply flag has been turned on (S103: YES), the processing proceeds to S104.

In S104, the target setting unit 55 checks whether it is a change point of the output shaft signals Sg1 and Sg2. Here, when the output shaft signals Sg1 and Sg2 have changed by at least a determination threshold value compared to a previous value, it is determined that the output shaft signals Sg1 and Sg2 are at the change points. The determination threshold value is set to be a sufficiently large value as compared to noise, sensor error and the like. If it is determined that output shaft signals Sg1 and Sg2 are not at the change point (S104: NO), the processing proceeds to S106. In case it is determined that the output shaft signals Sg1 and Sg2 are at the change points (S104: YES), the processing proceeds to S105.

In S105, the target setting unit 55 sets the target count value θcmd (refer to equation (1)).

$$\theta cmd = \theta en + Kz - C \quad (1)$$

A remaining count design value Kz in the equation is a value based on an angle between the change point of the output shaft signals Sg1 and Sg2 and the valley section corresponding to the target shift range. As shown in FIG. 3, for example, when the shift range is switched from the P range to the R range, the detent roller 26 moves from the first valley section 221 to the second valley section 222. Since the detent roller 26 is located at the top point of the first ridge section 226 at the timing when the output shaft signals Sg1 and Sg2 change from the value V1 to the value V2, the remaining count to the center of the second valley section 222 is the angle design value K21. Therefore, the remaining count design value Kz is set as the angle design value K21.

Further, for example, when the shift range is switched from the P range to the D range, the detent roller 26 moves from the first valley section 221 to the fourth valley section 224. Since the detent roller 26 is located at the top point of the first ridge section 226 at the timing when the output shaft signals Sg1 and Sg2 change from the value V1 to the value V2, the remaining count to the fourth valley section 224 is K21+K12+K13. Thus, the remaining count design value Kz can be calculated based on at least one of the angle design values K11 to K13 and K21 to K23. In the present embodiment, θen+Kz corresponds to "pre-correction motor angle target value."

Figure 5:
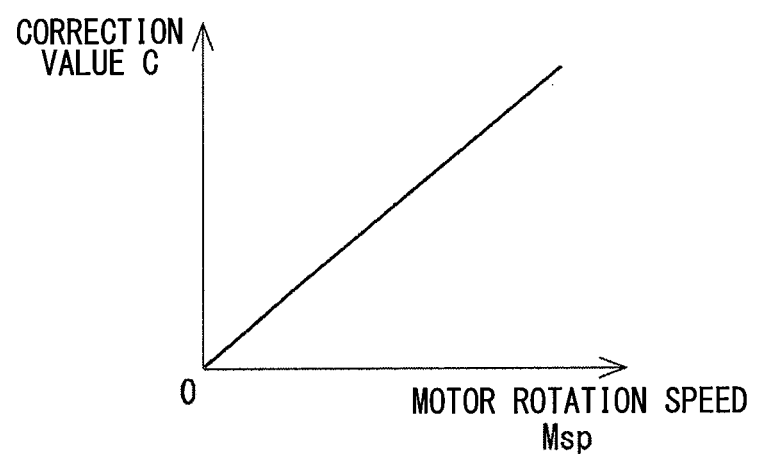
FIG. 5 is an explanatory diagram explaining a map for calculating a correction value according to the embodiment.

A correction value C in the equation is a value based on the motor speed Msp, and is calculated based on a map shown in FIG. 5. As shown in FIG. 5, the correction value C is a value corresponding to the detection delay or communication delay of the output shaft signals Sg1 and Sg2, and is set to a larger value as the motor speed Msp becomes larger. The map shown in FIG. 5 is set according to an acquisition delay in the signal acquisition unit 52, which is caused by the sensor characteristic, the signal acquisition path and the like. By correcting the pre-correction motor angle target value (θen+Kz) with the correction value C corresponding to the motor speed Msp, the target count value θcmd is appropriately set.

Instead of the target count value θcmd, the motor 10 may be controlled based on the remaining count correction value (Kz−C). In this case, the remaining count design value Kz corresponds to the "pre-correction motor angle target value," and the remaining count correction value (Kz−C) corresponds to the "motor angle target value." Further, the remaining count can also be regarded as a "remaining rotation angle," by which the motor 10 needs to rotate before stopping.

Referring to FIG. 4 again, the drive control unit 56 controls in S106 the drive of the motor 10 such that the encoder count value θen becomes the target count value θcmd. In S107, the drive control unit 56 checks whether the motor 10 has stopped at a position where the encoder count value θen becomes the target count value θcmd. The stop determination may be performed by any method. For example, after the encoder count value θen has become within a control range, fixed phase energization control, by which two predetermined phases are energized according to the rotor position, may be performed. Then, when a duration of the phase energization control exceeds a predetermined time, it may be determined that the motor 10 has stopped. In case it is determined that the motor 10 is not stopped (S107: NO), this routine is finished without executing processing of S108. In case it is determined that the motor 10 has stopped (S107: YES), the processing proceeds to S108 and the current supply flag is turned off.

Figure 6:
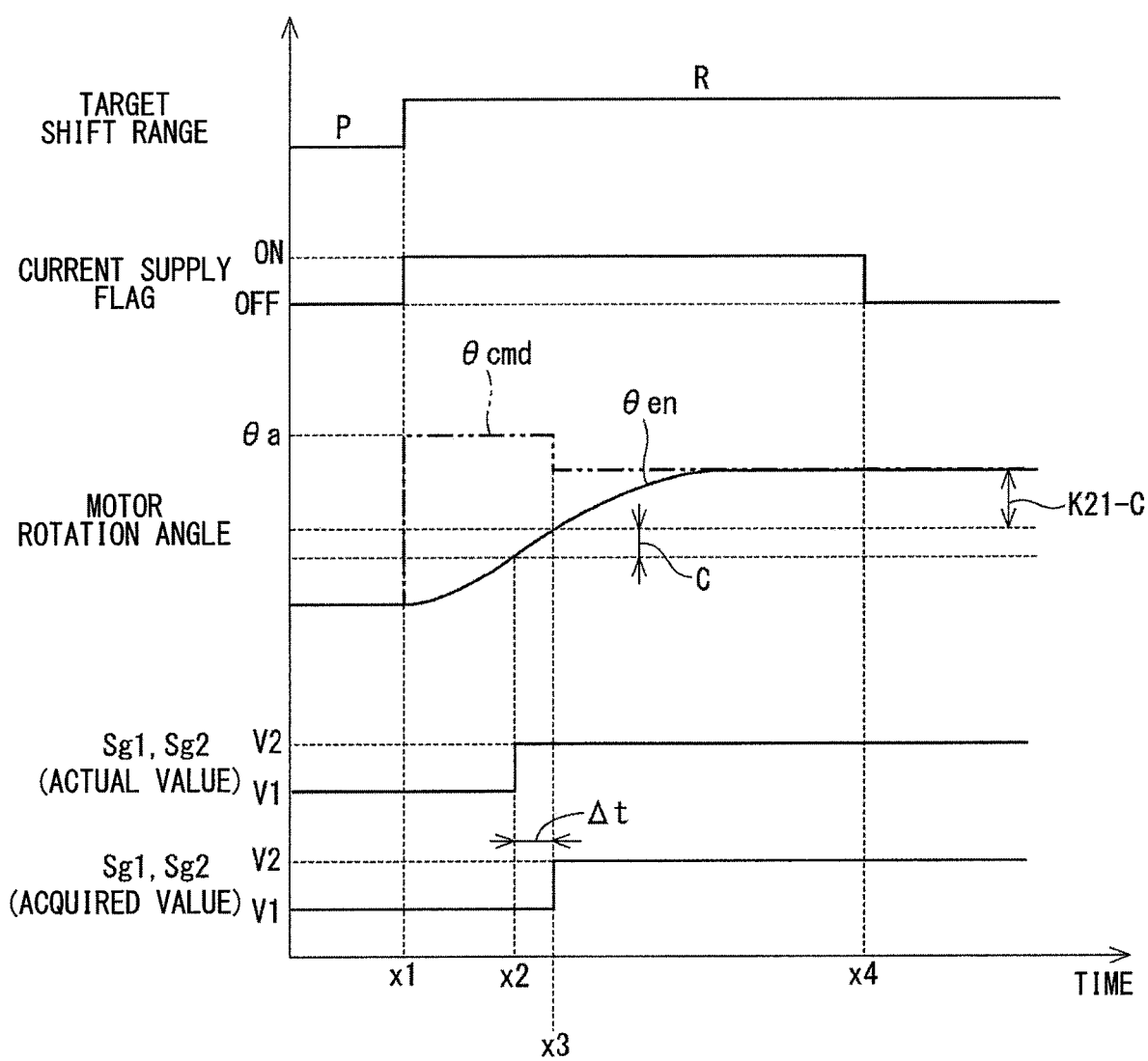
FIG. 6 is a time chart explaining motor drive processing according to the embodiment.

The motor control processing according to the embodiment will be described with reference to a time chart of FIG. 6. FIG. 6 shows, with the horizontal axis indicating time, from the top the target shift range, the current supply flag, the motor rotation angle, the actual value of the output shaft signals Sg1 and Sg2, and the acquired value of the output shaft signals Sg1 and Sg2. Here, the case of switching the shift range from the P range to the R range will be described as an example. It is noted that, for the purpose of explanation, the time scale and the like are changed as the case may be.

When the target shift range is switched from the P range to the R range at time x1, the current supply flag is turned on, the temporary target value θa is set as the target count value θcmd, and the driving of the motor 10 is started. In FIG. 6, the temporary target value θa is a value larger than a final target count value θcmd, but may be a smaller value.

At time x2 when the output shaft angle θs becomes the angle θ1 (refer to FIG. 3), the output shaft signals Sg1 and Sg2 change from the value V1 to the value V2. As described in FIG. 2, in the present embodiment, the output shaft signals Sg1 and Sg2 are output to the TM-ECU 60, and the SBW-ECU 50 acquires the output shaft signals Sg1 and Sg2 from the TM-ECU 60. Therefore, the change timing of the output shaft signals Sg1 and Sg2 acquired by the SBW-ECU 50 is time x3 delayed by a delay time width Δt from time x2 when the output shaft signals Sg1 and Sg2 have actually changed.

As a reference example, the value obtained by adding the angle design value K21 to the encoder count value θen at time x3 at which the change in the output axis signals Sg1 and Sg2 are detected by the SBW-ECU 50 is set as the target count value θcmd. In this case, the target count value θcmd is set to a position ahead of the center of the second valley section 222 by an amount of rotation of the motor 10 from time x2 to time x3. Therefore, in case that the motor 10 is the permanent magnet type DC brushless motor which generates a cogging torque, the detent roller 26 may not be fit in position to the center of the second valley section 222 due to the influence of the cogging torque.

Therefore, in the present embodiment, the target count value θcmd is corrected using the correction value C corresponding to the motor speed Msp. In the example of FIG. 6, in which the shift range is switched from the P range to the R range, the remaining count design value Kz is K21. For this reason, a value determined by adding (K21−C) to the encoder count value θen at time x3 is set as the target count value θcmd. Thereby, the target count value θcmd can be set appropriately. In case it is determined at time x4 that the motor 10 has stopped at the target count value θcmd, the current supply flag is turned off.

Although the switching from the P range to the R range is described in FIG. 6, the output shaft signals Sg1 and Sg2 change three times in case that the shift range is switched from the P range to the D range, for example. In this case, robustness can be improved by setting the target count value θcmd each time the output shaft signals Sg1 and Sg2 change. The target count value θcmd may be set at any one change timing even in case that the output shaft signals Sg1 and Sg2 change a plurality of times at the time of switching of the shift range.

As described above, the shift range control device 40 according to the present embodiment switches the shift range by controlling the driving of the motor 10, and includes the angle calculation unit 51, the signal acquisition unit 52, the target setting unit 55, and the drive control unit 56. The angle calculation unit 51 acquires the motor rotation angle signal SgE output from the encoder 13 that detects the rotation position of the motor 10, and calculates the encoder count value θen. The signal acquisition unit 52 acquires the output shaft signals Sg1 and Sg2, which are outputted from the output shaft sensor 16 for detecting the rotation position of the output shaft 15 to which the rotation of the motor 10 is transmitted, and the value of which changes in steps in accordance with the rotation position of the output shaft 15.

The target setting unit 55 set the target count value θcmd by correcting the pre-correction motor angle target value (θe+Kz), which is set based on the change point at the timing of change of the output shaft signals Sg1 and Sg2, and the target shift range, based on the motor speed Msp detected at the change timing of the acquired output shaft signals Sg1 and Sg2. The drive control unit 56 controls the drive of the motor 10 such that the encoder count value θen attains the target count value θcmd.

In this embodiment, the value corrected using the correction value C, which is determined based on the motor speed Msp at the change timing of the output shaft signals Sg1 and Sg2, is used as the target count value θcmd. It is possible to correct the error caused because of the detection delay and communication delay and realize highly accurate positioning control.

The output shaft 15 rotates integrally with the detent plate 21 having a plurality of valley sections 221 to 224, to which the detent roller 26 is engaged in correspondence to the shift range. The output shaft signals Sg1 and Sg2 change stepwise to take different values between before and after the movement when the detent roller 26 moves between the adjacent valley sections 221 to 224. Thus, it is possible to appropriately set the target count value θcmd in accordance with the switching of the shift range.

The output shaft signals Sg1 and Sg2 are output from the output shaft sensor 16 to the TM-ECU 60 that controls the shift position of the automatic transmission 5. The signal acquisition unit 52 acquires the output shaft signals Sg1 and Sg2 from the TM-ECU 60. In case the output shaft signals Sg1 and Sg2 are acquired via the TM-ECU 60 which is the control unit different from the SBW-ECU 60 constituting the signal acquisition unit 52, the delay width Δt becomes large in comparison to a case that the output shaft signals Sg1 and Sg2 are directly acquired from the output shaft sensor 16. Thus, the position control accuracy may be deteriorated when the correction is not performed. In the present embodiment, since the target count value θcmd is corrected according to the motor speed Msp at the timing when the output shaft signals Sg1 and Sg2 change, it is possible to realize the positioning with high accuracy, even in case that the delay width Δt is relatively large.

Other Embodiment

In the embodiment described above, the motor is the DC brushless motor. In another embodiment, the motor may be any motor, such as a switched reluctance motor. In the embodiment described above, although the number of winding sets of the motor is not referred to, the number of winding sets may be one or plural.

In the embodiment described above, the motor rotation angle sensor is the encoder. In another embodiment, the motor rotation angle sensor need not necessarily be the encoder but may be any other devices such as a resolver.

That is, the motor angle is not limited to the encoder count value but may be any value that can be converted into the motor angle.

In the embodiment described above, the MR sensor is used as the output shaft sensor. In another embodiment, any other sensors may be used. Moreover, in the embodiment described above, the double system is formed such that two independent output shaft signals are output from the output shaft sensor. In another embodiment, the number of output shaft signals output from the output shaft sensor may be one or three or more. That is, the output shaft sensor may be a single system type or a triple or more multiplex system type. The motor rotation angle sensor may be a multiple system.

In the embodiment described above, the output shaft sensor outputs the output shaft signal to the transmission control unit. In another embodiment, the output shaft sensor may output the output shaft signal directly to the shift range control device, or may output it to a control unit, which is other than the transmission control unit and capable of transmitting the output shaft signal to the shift range control device.

In the embodiment described above, the value of the output shaft signal changes stepwise when the engagement member is positioned at the top point of the ridge section, and the number of engagement positions matches the number of steps of the output shaft signal. In another embodiment, the output shaft signal may change stepwise when the engagement member is located anywhere between the valley sections. In another embodiment, the number of engagement positions and the number of steps of the output shaft signal may be different. For example, the value of the output shaft signal may change stepwise at the P range side and the notP range side of the top point of the ridge section.

In the embodiment described above, the rotation member is the detent plate, and the engagement member is the detent roller. In another embodiment, the rotation member and the engagement member are not limited to the detent plate and the detent roller, but may be any other type in regard to a shape and the like. In the embodiment described above, the detent plate is provided with four valley sections. In another embodiment, the number of valley sections is not limited to four, and may be two or more. For example, the number of valley sections may be two and the P range and the notP range may be switched. The shift range switching mechanism and the parking lock mechanism or the like may be different from the embodiment described above.

In the embodiment described above, the speed reducer is placed between the motor shaft and the output shaft. Although the details of the speed reducer are not described in the embodiment described above, it may be configured by using, for example, a cycloid gear, a planetary gear, a spur gear that transmits torque from a reduction mechanism substantially coaxial with the motor shaft to a drive shaft, or any combination of these gears. In another embodiment, the speed reducer between the motor shaft and the output shaft may be omitted, or a mechanism other than the speed reducer may be provided. The present disclosure is not limited to the embodiment described above but various modifications may be made within the scope of the present disclosure.

The present disclosure has been made in accordance with the embodiment. However, the present disclosure is not limited to such an embodiment and structures. That is, this disclosure also encompasses various modifications and variations within the scope of equivalents. Furthermore, various combination and formation, and other combination and formation including one, more than one or less than one element may be made in the present disclosure.

What is claimed is:

1. A shift range control device for switching a shift range by controlling driving of a motor, the shift range control device comprising:
    an angle calculation unit for acquiring a motor rotation angle signal outputted from a motor rotation angle sensor that detects a rotation position of the motor, and calculating a motor angle;
    a signal acquisition unit for acquiring an output shaft signal, which is outputted from an output shaft sensor for detecting a rotation position of an output shaft to which rotation of the motor is transmitted, a value of the output shaft signal changing in steps in accordance with the rotation position of the output shaft;
    a target setting unit for setting a motor angle target value by correcting, in accordance with a speed of the motor at a timing at which an acquired output shaft signal has changed, a pre-correction motor angle target value that is set based on a target shift range and a change point at which the output shaft signal changes; and
    a drive control unit for controlling driving of the motor such that the motor angle becomes the motor angle target value.

2. The shift range control device according to claim 1, wherein:
    the output shaft rotates integrally with a rotation member having a plurality of valley sections to which an engagement member is engaged in correspondence to the shift range; and
    the output shaft signal changes stepwise so as to have different values between before and after movement when the engagement member moves to an adjacent valley section.

3. The shift range control device according to claim 1, wherein:
    the output shaft signal is output from the output shaft sensor to a transmission control unit that controls a shift position of an automatic transmission; and
    the signal acquisition unit acquires the output shaft signal from the transmission control unit.

4. A shift range control device for switching a shift range by controlling driving of a motor, the shift range control device comprising a microcomputer having a memory and programmed to execute processing of:
    acquiring a motor rotation angle signal outputted from a motor rotation angle sensor that detects a rotation position of the motor, and calculating a motor angle;
    acquiring an output shaft signal outputted from an output shaft sensor for detecting a rotation position of an output shaft to which rotation of the motor is transmitted through a rotation speed reducer, a value of the output shaft signal changing in steps in accordance with the rotation position of the output shaft;
    setting a motor angle target value by correcting, in accordance with a speed of the motor at a timing at which an acquired output shaft signal has changed, a pre-correction motor angle target value that is set based on a target shift range and a change point at which the output shaft signal changes; and
    controlling driving of the motor such that the motor angle becomes the motor angle target value.

5. The shift range control device according to claim 4, wherein:
    the output shaft signal changes stepwise so as to have different values between before and after rotation of a rotation member, which is integrally rotatable with the output shaft and having a plurality of valley sections to which an engagement member is engaged in correspondence to the shift range.

6. The shift range control device according to claim 5, wherein:
the processing of acquiring the output shaft signal acquires the output shaft signal of the output shaft sensor indirectly through a transmission control unit, which controls a shift position of an automatic transmission.

7. The shift range control device according to claim 4, wherein:
the processing of acquiring the output shaft signal acquires the output shaft signal of the output shaft sensor indirectly through a transmission control unit, which controls a shift position of an automatic transmission.

\* \* \* \* \*